(12) United States Patent
Petty

(10) Patent No.: US 6,574,220 B1
(45) Date of Patent: Jun. 3, 2003

(54) TRAFFIC SHAPER THAT ACCOMMODATES MAINTENANCE CELLS WITHOUT CAUSING JITTER OR DELAY

(75) Inventor: Norman W. Petty, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/345,124

(22) Filed: Jul. 6, 1999

(51) Int. Cl.[7] ............................................. H04L 12/28
(52) U.S. Cl. ..................................... 370/395
(58) Field of Search ................................ 370/392–399, 370/230–235, 412–416, 429; 707/8–12; 703/22

(56) References Cited

U.S. PATENT DOCUMENTS

| | | | | |
|---|---|---|---|---|
| 5,412,799 A | * | 5/1995 | Papadopoulos | 703/22 |
| 5,457,687 A | * | 10/1995 | Newman | 370/232 |
| 6,091,708 A | * | 7/2000 | Matsunuma | 370/233 |
| 6,208,655 B1 | * | 3/2001 | Hodgins et al. | 370/397 |
| 6,453,316 B1 | * | 9/2002 | Karibe et al. | 707/8 |

FOREIGN PATENT DOCUMENTS

| EP | 0 669 777 | 8/1995 | H04Q/11/04 |
|---|---|---|---|

OTHER PUBLICATIONS

Boyer P Et Al: *A Spacer–Multiplexer For Public UNIs*, Proceedings Of The International Switching Symposium, De, Berlin, VDE Verlag, Published Apr. 23, 1995, pp. 457–461.

N.W. Petty 33, *Computationally–Efficient Traffic Shaper*, a Lucent Technologies Inc. patent application filed Feb. 23, 1999, Ser. # 09/256015.

\* cited by examiner

*Primary Examiner*—Kwang Bin Yao
*Assistant Examiner*—Prenell Jones
(74) *Attorney, Agent, or Firm*—David Volejnicek

(57) ABSTRACT

A traffic shaper (121) accommodates F5 maintenance cells of an ATM constant bit rate (CBR) virtual circuit without causing jitter or delay of the CBR traffic cells. Each virtual circuit is allocated two queues: a first queue (131) for enqueuing CBR traffic cells and a second queue (132) for enqueuing maintenance cells. Each virtual circuit is allocated twice its normal bandwidth on the transmission medium (120). A dequeue state machine (140) transmits contents of each first queue at twice the normal transmission rate during one half of each normal transmission interval of the queue's corresponding virtual circuit, and transmits contents of each second queue at twice the normal transmission rate during the other half of each normal transmission interval of the queue's corresponding virtual circuit. F5 cell transmissions are thus locked half-way between, and 180° out of phase with, transmissions of sequential CBR traffic cells, and consequently introduce no jitter or delay, at the expense of allocated bandwidth.

30 Claims, 3 Drawing Sheets

TRAFFIC SHAPER THAT ACCOMMODATES MAINTENANCE CELLS WITHOUT CAUSING JITTER OR DELAY

TECHNICAL FIELD

This invention relates generally to packet-switching systems, such as asynchronous transfer mode (ATM) systems, and specifically to traffic shapers of such systems.

BACKGROUND OF THE INVENTION

Today's business communications environment consists of two separate network infrastructures: a voice network (such as a private branch exchange (PBX)) characterized by real-time, high-reliability, constant bit-rate (CBR) connections; and a data network (such as a packet network) characterized by high-bandwidth variable bit-rate (VBR) connections. Business needs for simplified maintenance, management, and access to information on diverse networks are forcing the convergence of these networks along with a new class of real-time multimedia networks. Asynchronous transfer mode (ATM) provides a single infrastructure that cost-effectively and flexibly handles both switching and transmission for the traffic types mentioned above (voice, video, and data) for both local-area networks and wide-area networks. The evolving network convergence requires the adaptation of the legacy PBX voice traffic to ATM. Voice telephony over ATM (VTOA) specifications allow adaptation of compressed or uncompressed voice pulse-code modulated (PCM) data streams into streams (virtual circuits) of CBR cells.

An ATM cell, regardless of the traffic it carries, is a packet 53 octets long: 48 octets of payload attached to a 5-octet header. The header contains addressing and management information used to direct the cell from source to destination and to ensure that the negotiated aspects of the traffic-flow through the ATM network are met. CBR traffic is assembled into cell payloads using ATM Adaptation Layer 1 (AAL1). The AAL1 cell constructor layer uses the first octet of the payload for its header and the remaining 47 octets to carry CBR information. ATM cell construction is then completed by attaching the ATM header to the payload.

An individual ATM cell carries traffic of a single narrowband or wideband channel (a virtual circuit). Illustratively, a narrowband channel is represented by a single time slot of each successive frame of a TDM bus, while a wideband channel is represented by a plurality of time slots of each successive frame of a TDM bus. If a transmitter handles a plurality of virtual circuits, different ones of the ATM cells that it transmits carry traffic of different virtual circuits. Likewise, if a receiver handles a plurality of virtual circuits, different ones of the ATM cells that it receives carry traffic of different virtual circuits. A transmitter may transmit the traffic of different virtual circuits to different receivers. Likewise, a receiver may receive the traffic of different virtual circuits from different transmitters. The traffic of each virtual circuit is processed by its own instance of the AAL1 cell constructor layer; the number of active instances varies as virtual circuits are added and removed.

ATM switches police cell traffic to ensure that it does not exceed the cell-traffic capacity of the switches. The average cell rate is policed on a per-switch basis, but the peak (instantaneous) cell rate is policed on a per-virtual-circuit basis. Receiving ATM switches delete received cells of each virtual circuit that exceed that virtual circuit's negotiated peak cell rate. And transmitting ATM switches meter out cells from each virtual circuit to ensure that they do not exceed that virtual circuit's negotiated peak cell rate.

The ATM standards specify a Generic Cell Rate Algorithm (GCRA) for use by both hardware and software-implemented devices, called traffic shapers, for metering out cells. The GCRA requires the traffic shapers to periodically process the output queue of each virtual circuit. The period may be different for each virtual circuit, and is a function of the negotiated peak cell rate for that virtual circuit. In the case of PCM traffic having an 8 KHz sampling rate, the processing period is the 125 us frame period. The queues of all virtual circuits are processed during each period. If the queue of a virtual circuit is empty, the traffic shaper does not transmit a cell from that queue. If a cell is available in the queue of a virtual circuit, the traffic shaper transmits it if it meets the GCRA criterion, i.e., if the period between the last transmitted cell from this queue and now is greater than or equal to the minimum administered cell-rate period. If more than one cell is available in the queue of a virtual circuit, the traffic shaper transmits one cell from the queue if it meets the GCRA criterion, and the next cell must wait at least until the subsequent processing period to be transmitted. A spacing of at least 125 us between transmitted ATM cells from any virtual circuit is thus ensured, thereby guaranteeing that the virtual circuit does not exceed its negotiated peak cell rate.

ATM standards support layer-management messages to isolate connection problems. F4 cells are used for virtual-path management, and F5 cells are used for virtual-circuit management. F4 cells are transported by their own, dedicated, virtual circuit, while F5 cells are transported by the virtual circuit to which they relate. The standards recommend requesting a higher bandwidth for a virtual circuit than is needed to carry bearer traffic in order to accommodate F5 cell insertion in the traffic cell stream. The F5 cell insertion causes an increase in the cell-delay variation (jitter) by displacing in time the traffic cell that would otherwise be transmitted at the instant of the F5 cell transmission. This does not pose a problem for VBR channels, but it does present a problem for CBR channels, because it destroys the constant bit-rate of the channel's bearer traffic stream. The jitter can be eliminated at the receiving end by buffering the received traffic, but this in turn causes an increase in the traffic cell delay, which is undesirable in real-time applications such as voice communications. There is no specific standard dealing with F5 cell insertion into CBR traffic streams, and the standards that do exist fail to address these problems.

SUMMARY OF THE INVENTION

This invention is directed to solving these and other problems and disadvantages of the prior art. Illustratively according to the invention, twice the normal bandwidth is allocated to each CBR channel, the bearer traffic of that channel is transmitted at twice its normal rate during one half of each normal transmission period, and the F5 cells are transmitted during the other half of each normal transmission period. F5 cell transmissions are thus phase-locked 180° out-of-phase with CBR traffic cell transmissions. F5 cells are thus transmitted exactly half-way between sequential CBR traffic cells. This requires twice the normal bandwidth to avoid traffic contract violation, but introduces no jitter or delay for the CBR traffic cells. Both delay and jitter in the bearer traffic stream are thus avoided at the expense of allocated bandwidth.

Generally according to the invention, traffic shaping for a steam of traffic (e.g., a CBR ATM virtual circuit) that usually has a first transmission rate and a transmission interval associated with that rate, is effected as follows. The traffic stream is allocated two queues: one for enqueuing traffic and the other for enqueuing control information (e.g., F5 cells). Contents of the first queue are then transmitted during a first half of each said transmission interval at twice the first transmission rate, and contents of the second queue are transmitted during a second half of each said transmission interval, illustratively also at twice the first transmission rate. The stream of traffic is illustratively a stream of packets, such as ATM cells, for example. The first transmission rate is then the usual rate of transmission of the packets, and the transmission interval is an inverse of the rate of transmission of the packets.

Further generally according to the invention, traffic shaping for a plurality of streams of traffic, each having its own transmission rate and its own transmission interval associated with its own transmission rate, is effected as follows. Each stream is allocated its own pair of queues: one for enqueuing its traffic and the other for enqueuing its control information. Contents of each first queue are transmitted at twice the transmission rate of its corresponding traffic stream during a first half of the corresponding transmission interval of the corresponding traffic stream. Contents of each second queue are transmitted during a second half of the corresponding transmission interval of the corresponding traffic stream, illustratively also at twice the transmission rate of its corresponding traffic stream.

Although it can be implemented in hardware, the subject invention is particularly suited for implementation in software, including firmware, or in an integrated circuit.

The invention includes both a method as well as a corresponding apparatus, and a computer readable medium that contains software which, when executed in a computer, causes the computer to perform the method. The apparatus preferably includes an effector—any entity that effects the corresponding step, unlike a means—for each method step.

These and other features and advantages of the present invention will become more apparent from the following description of an illustrative embodiment of the invention considered together with the drawing.

DETAILED DESCRIPTION

Figure 1:
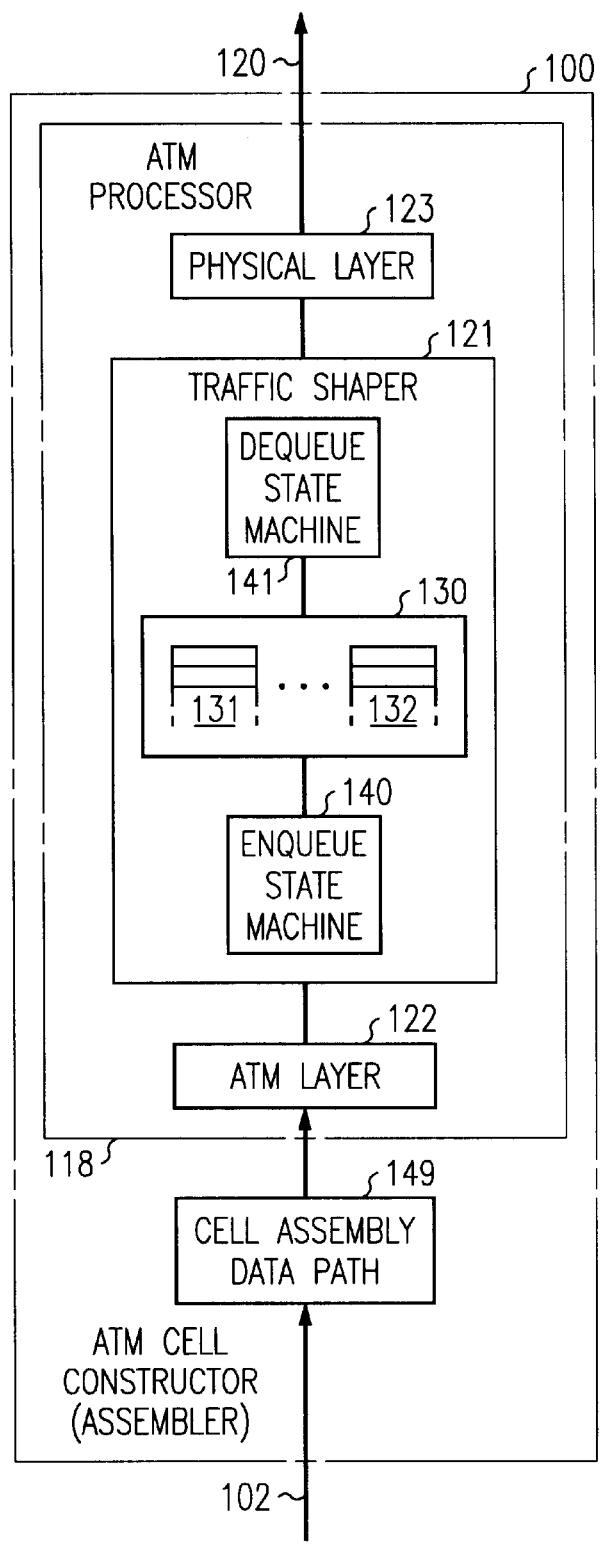
FIG. 1 is a block diagram of an ATM cell constructor that includes an illustrative embodiment of the invention.

FIG. 1 shows an ATM cell constructor 100, also known as an ATM cell assembler, such as may be used in an interface port circuit of a PBX or in any other ATM interface apparatus to construct ATM cells from a stream of traffic, such as voice and/or video traffic. An illustrative example of an ATM cell constructor is described in my patent application entitled "An Arrangement for Minimizing Cell-Delay Variations in a Communications System that Supports Multiple Constant-Bit-Rate Connections", Ser. No. 09/096,887, filed on Jun. 12, 1998, and assigned to the same assignee as this application. Cell constructor 100 and each of its components may be individually implemented either in hardware or in software/firmware, either alone or in an integrated circuit with other devices. The software or firmware may be stored in any desired storage device readable by a computer—for example, a read-only memory (ROM) device readable by an interface port circuit processor. Multiple virtual circuits (also referred to herein as channels, calls, or communications) of CBR traffic are received by ATM cell constructor 100 over a communications medium 102, and follow a data path 149 through ATM cell constructor 100 where successive segments of the traffic are formed into packets (ATM cells). If the switching system employing ATM cell constructor 100 is the Definity® PBX of Lucent Technologies Inc., medium 102 is a time-division multiplexed (TDM) bus that carries up to 242 individual channels of traffic in 242 individual time slots of repeating frames. Each frame carries one (narrowband) or more (wideband) time slots of each channel's traffic stream. Each time slot carries one byte (octet) of traffic.

The bytes of traffic of individual channels are assembled into ATM cells in data path 149. It takes on the order of a TDM bus frame-interval to process an individual time slot of traffic through data path 149; of course, up to a frame's worth of time slots may be processed in parallel. A TDM bus frame-interval is therefore taken as a cell construction period. It is a predetermined time interval during which each virtual circuit can mature an ATM cell for transmission. It can take up to 47 frames to construct a cell, however. An ATM processor 118 sequentially receives mature ATM cells and transmits them on an ATM communications medium 120 towards their destinations. ATM processor 118 comprises a conventional ATM layer 122 and a conventional physical layer 123 interfaced by a traffic shaper 121. Traffic shaper 121 ensures that the peak instantaneous cell transmission rate of each virtual circuit does not exceed its negotiated peak cell rate. Traffic shaper 121 comprises a plurality 130 of shaping queues 131–132, a traffic shaper dequeue state machine 141 which functions as a transmitter for shaping queues 131–132, and a traffic shaper enqueue state machine 140 which functions as a receiver for shaping queues 131–132.

Figure 2:
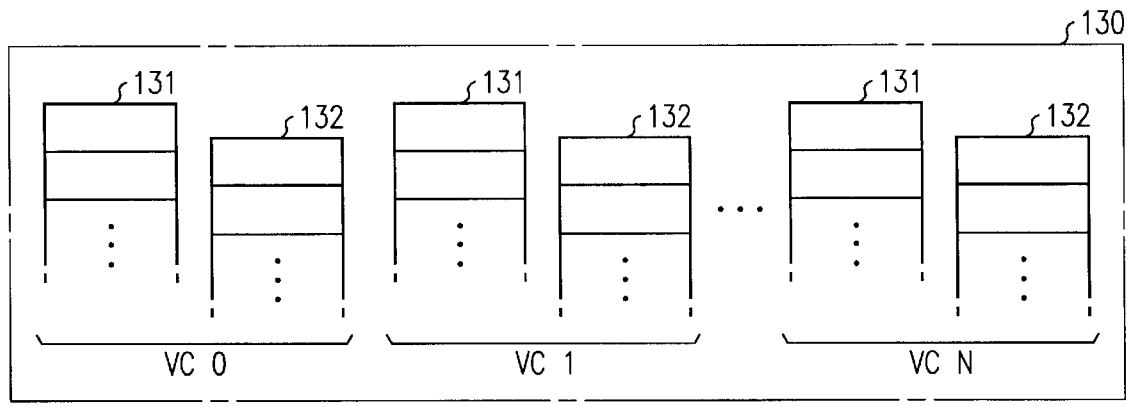
FIG. 2 is a diagram of queues of an embodiment of a traffic shaper of the ATM cell constructor of FIG. 1.

The plurality 130 of shaping queues 131–132 configured according to the invention are shown in FIG. 2. The plurality 130 includes the conventional one traffic queue 131 per virtual circuit. In addition, the plurality 130 includes an additional one maintenance queue 132 per virtual circuit. Queues 131 are used for cells carrying bearer traffic, while queues 132 are used for cells carrying control information, particularly F5 maintenance cells that correspond to the associated virtual circuit.

Figure 3:
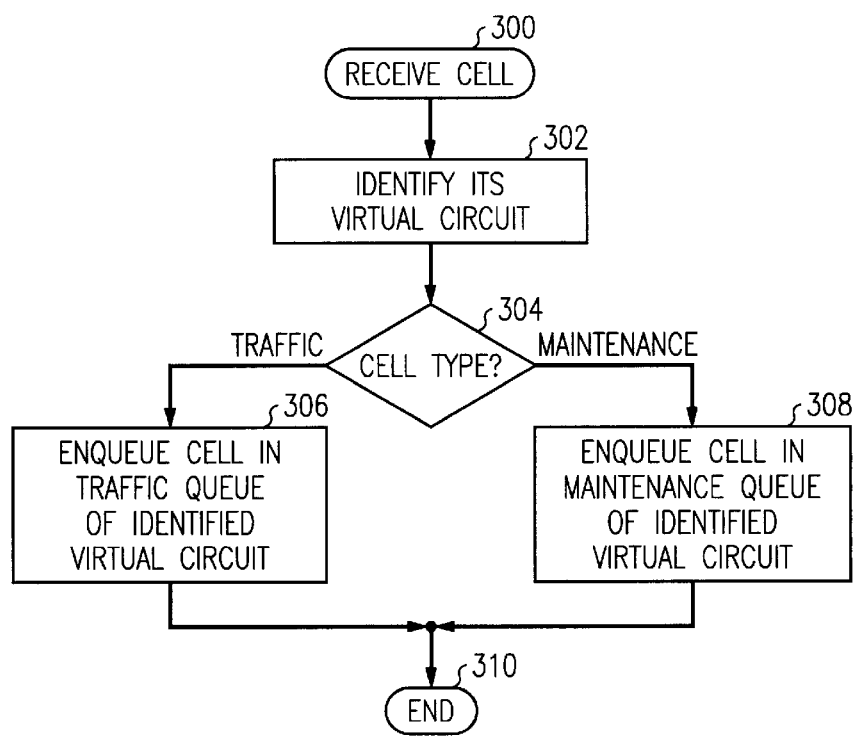
FIG. 3 is a functional flow diagram of operations of an enqueue state machine of the traffic shaper of FIG. 2.

The operation of enqueue state machine 140 relative to the plurality 130 of queues 131–132 is shown in FIG. 3. Upon receiving a cell from ATM layer 122, at step 300, state machine 140 determines the cell's virtual circuit from the cell's VPI/VCI, at step 302, and determines whether the cell is a traffic-bearing cell or a maintenance cell, at step 304. If the cell is traffic-bearing, state machine 140 enqueues it in queue 131 of the corresponding virtual circuit, at step 306. If the cell is a maintenance cell, state machine 140 enqueues it in queue 132 of the corresponding virtual circuit, at step 308. State machine 140 then ends its operation, at step 310.

Figure 4:
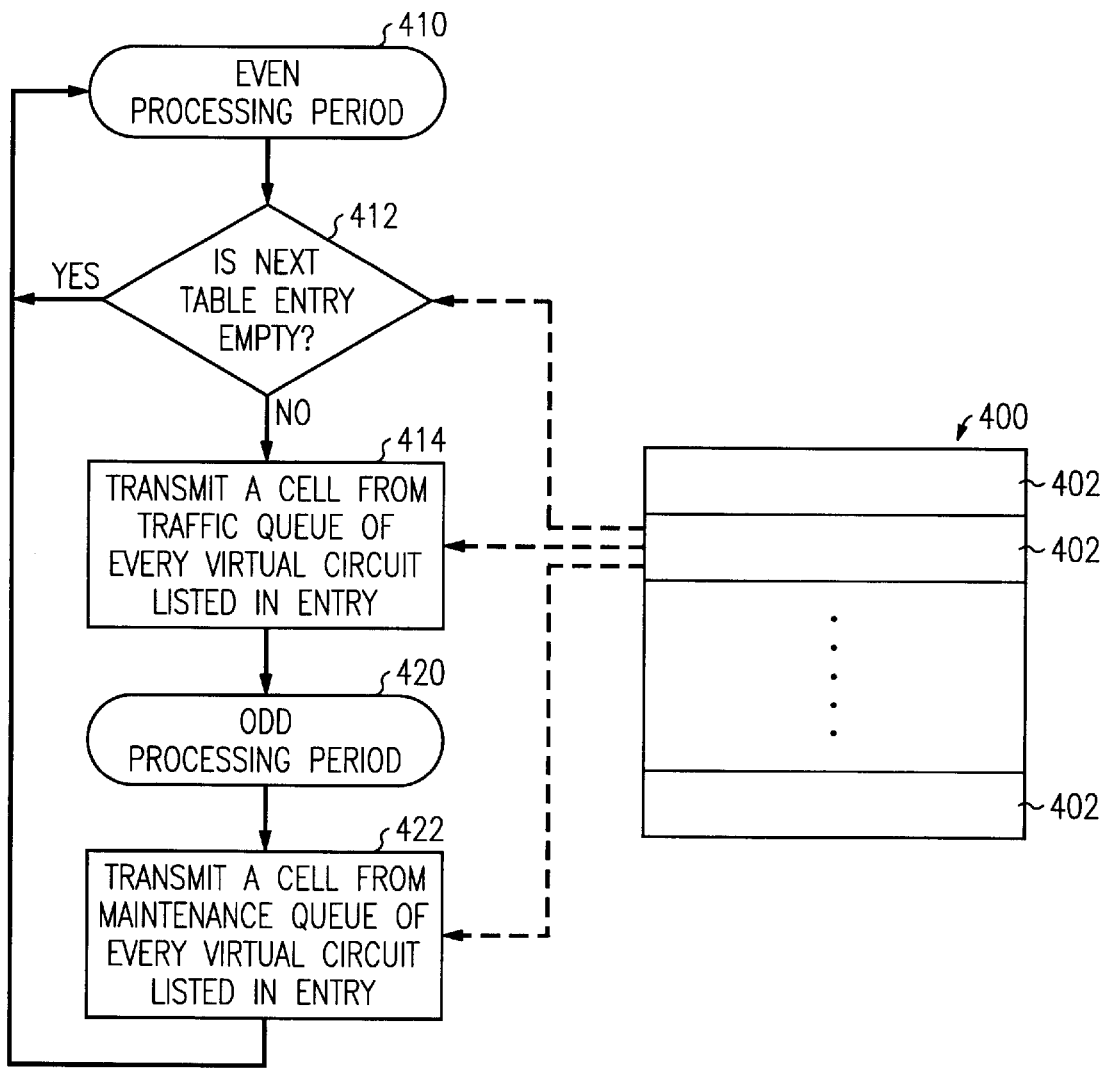
FIG. 4 is a functional flow diagram of operations of a dequeue state machine of the traffic shaper of FIG. 2.

According to the invention, each virtual circuit is assigned twice its normal, traffic-bearing transmission rate, or bandwidth, on transmission link 120. One-half of the assigned bandwidth is used conventionally for carrying the contents of queue 131 (the bearer traffic) during one half of each transmission interval for that normal traffic-bearing transmission rate, and the other half is used for carrying the contents of queue 132 (the maintenance cells) during the other half of each transmission interval for that normal traffic-bearing transmission rate, even though the packet or data rate of maintenance cells is normally very low compared to the rate of the traffic. The operation of dequeue state machine 141 relative to the plurality 130 of queues is shown in FIG. 4.

Dequeue state machine 141 has a table 400 of entries 402 each corresponding to a pair of sequential queue processing periods. Each entry lists the virtual circuits whose queues 131 and 132 have to be processed by state machine 141 during the corresponding two queue processing periods. A queue processing period is a time interval equal to an inverse of the assigned bandwidth of a fastest one of the virtual circuits, which is one half of the conventional transmission interval of the fastest virtual circuit, or one half of the frame period of 125 us in this instance. At the start of every even processing period, at step 410, state machine 141 checks the next sequential entry 402 in table 400 to see if it is empty, at step 412. If it is at the end of table 400, state machine 141 returns to the beginning thereof. If the checked entry 402 is empty, state machine 141 returns to step 410 to await the next even processing period. If the checked entry 402 is not empty, state machine 141 transmits one cell from every queue 131 that is identified by the entry 402 and which has a cell enqueued therein, at step 414, and proceeds to await occurrence of the next, odd, processing period, at step 420. At the start of every odd processing period, at step 420, state machine 141 transmits one-cell from every queue 132 that is identified by the present entry 402 and Which has a cell enqueued therein, at step 422, and then returns to step 410 to await occurrence of the next, even, processing period.

Alternatively, if all of the virtual circuits have the same bandwidth, table 400 is not needed and state machine 141 simply transmits a cell from each queue 131 that has a cell during every even processing period and transmits a cell from each queue 132 that has a cell during every odd processing period.

In either case, the maintenance cells are always transmitted 180° out of phase with the traffic cells of the corresponding virtual circuit. Hence, their insertion introduces no cell-delay variation (jitter) into the CBR traffic stream.

Of course, various changes and modifications to the illustrative embodiments described above will be apparent to those skilled in the art. For example, the invention can also be implemented and used with the traffic shaper disclosed in my application Ser. No. 09/256,015, filed on Feb. 23, 1999. Also, a hardware implementation of the traffic shaper may use a clock operating at the normal transmission rate and define the odd and even processing periods with the rising and falling clock signal edges, i.e., transmit from the traffic queues on one of the rising or falling clock edges and transmit from the maintenance queues on the other of the rising or falling clock edges. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A traffic shaper for a stream of traffic having a first transmission rate and a transmission interval associated with the first transmission rate, comprising:

a first queue for enqueuing the traffic of the stream of traffic having the first transmission rate and the transmission interval associated with the first transmission rate;

a second queue for enqueuing control information corresponding to the traffic stream; and a transmitter cooperative with the first and the second queues for transmitting contents of the first queue at twice the first transmission rate during a first half of each said transmission interval and transmitting contents of the second queue during a second half of each said transmission interval.

2. The traffic shaper of claim 1 wherein:

the transmitter is for transmitting the contents of the second queue at twice the first transmission rate.

3. The traffic shaper of claim 1 further comprising:

enqueuing means cooperative with the first and the second queues and responsive to receipt of the traffic of the stream, for enqueuing the received traffic in the first queue, and responsive to receipt of the control information for enqueuing the received information in the second queue.

4. The traffic shaper of claim 1 wherein:

the stream of traffic has a constant bit rate.

5. The traffic shaper of claim 1 wherein:

the stream of traffic comprises a stream of packets, the first transmission rate comprises a rate of transmission of the packets, and the transmission interval comprises an inverse of the rate of transmission of the packets; and the control information comprises packets of control information.

6. The traffic shaper of claim 5 wherein:

the stream of packets comprises an asynchronous transfer mode (ATM) virtual circuit.

7. The traffic shaper of claim 6 wherein:

the stream of traffic has a constant bit rate.

8. The traffic shaper of claim 7 wherein:

the packets of control information comprise ATM F5 cells.

9. A traffic shaper for a plurality of streams of traffic each having its own transmission rate and its own transmission interval associated with its own transmission rate, comprising:

a plurality of first queues each corresponding to a different one of the plurality of the streams of traffic each having said its own transmission rate and said its own transmission interval associated with said its own transmission rate for enqueuing the traffic of the corresponding stream;

a plurality second queues each corresponding to a different one of the plurality of streams for enqueuing control information for the corresponding traffic stream; and a transmitter cooperative with the first and the second queues for transmitting contents of each first queue at twice the transmission rate of its corresponding traffic stream during a first half of the corresponding transmission interval of its corresponding traffic stream, and transmitting contents of each second queue during a second half of the corresponding transmission interval of its corresponding traffic stream.

10. The traffic shaper of claim 9 wherein:

the transmitter is for transmitting the contents of each second queue at twice the transmission rate of its corresponding traffic stream.

11. The traffic shaper of claim 10 further comprising:

enqueuing means cooperative with the first and the second queues and responsive to receipt of the traffic of a stream for enqueuing the received traffic in the first queue corresponding to that stream, and responsive to receipt of the control information for a stream for enqueuing the received information in the second queue corresponding to that stream.

12. The traffic shaper of claim 11 wherein:

each stream of traffic has a constant bit rate.

13. The traffic shaper of claim 12 wherein:

each stream of traffic comprises a stream of packets, each stream's own transmission rate comprises a rate of transmission of the packets of that stream, and each stream's own transmission interval is an inverse of that stream's rate of transmission of the packets; and the control information comprises packets of control information.

14. The traffic shaper of claim 13 wherein:

each traffic stream comprises an asynchronous transfer mode (ATM) virtual circuit.

15. The traffic shaper of claim 14 wherein:

the packets of control information comprise ATM F5 cells.

16. A method of shaping traffic of a stream of traffic having a first transmission rate and a transmission interval associated with the first transmission rate, comprising:

in response to receipt of the traffic of the stream of traffic having the first transmission rate and the transmission interval associated with the first transmission rate, enqueuing the received traffic in a first queue;

in response to receipt of control information corresponding to the stream, enqueuing the received control information in second queue;

during a first half of each said transmission interval, transmitting contents of the first queue at twice the first transmission rate; and during a second half of each said transmission interval, transmitting contents of the second queue.

17. The method of claim 16 wherein:

transmitting contents of the second queue comprises transmitting the contents of the second queue at twice the first transmission rate.

18. The method of claim 16 wherein:

the stream of traffic has a constant bit rate.

19. The method of claim 16 wherein:

the stream of traffic comprises a stream of packets, the first transmission rate comprises a rate of transmission of the packets, and the transmission interval comprises an inverse of the rate of transmission of the packets; and the control information comprises packets of control information.

20. the method of claim 19 wherein:

the stream of packets comprises an asynchronous transfer mode (ATM) virtual circuit.

21. The method of claim 20 wherein:

the stream of traffic has a constant bit rate.

22. The method of claim 21 wherein:

the packets of control information comprise ATM F5 cells.

23. A method of shaping traffic of a plurality of streams of traffic each having its own transmission rate and its own transmission interval associated with its own transmission rate, comprising:

in response to receipt of the traffic of one of the streams of traffic each having said its own transmission rate and said its own transmission interval associated with said its own transmission rate, enqueuing the received traffic in one of a plurality of first queues each corresponding to a different one of the streams, the one first queue corresponding to the one stream;

in response to receipt of control information corresponding to one of the streams, enqueuing the received control information in one of a plurality of second queues each corresponding to a different one of the streams, the one second queue corresponding to the one stream;

transmitting contents of each first queue at twice the transmission rate of its corresponding traffic stream during a first half of the corresponding transmission interval of its corresponding traffic stream; and transmitting contents of each second queue during a second half of the corresponding transmission interval of its corresponding traffic stream.

24. The method of claim 23 wherein:

transmitting contents of each second queue comprises transmitting the contents of each second queue at twice the transmission rate of its corresponding traffic stream.

25. The method of claim 24 wherein:

the stream of traffic has a constant bit rate.

26. The method of claim 25 wherein:

each stream of traffic comprises a stream of packets, each stream's own transmission rate comprises a rate of transmission of the packets of that stream, and each stream's own transmission interval is an inverse of that stream's rate of transmission of the packets; and the control information comprises packets of control information.

27. The method of claim 26 wherein:

each traffic stream comprises an asynchronous transfer mode (ATM) virtual circuit.

28. The method of claim 27 wherein:

the packets of control information comprise ATM F5 cells.

29. An apparatus for performing the method of any one of the claims 16–28.

30. A computer-readable medium containing software which, when executed in a computer, causes the computer to perform the method of any one of the claims 16–28.

* * * * *